United States Patent [19]

Antonini et al.

[11] 3,907,912

[45] Sept. 23, 1975

[54] FLUID BED OXYCHLORINATION OF ETHYLENE

[75] Inventors: Albert Antonini; Philippe Joffre, both of Paris; Francois Laine, Martiques, all of France

[73] Assignee: Produits Chimiques Pechiney-Saint-Gobain, Neuilly-sur-Seine, France

[22] Filed: May 27, 1971

[21] Appl. No.: 147,611

Related U.S. Application Data

[63] Continuation-in-part of Ser. No. 730,604, May 20, 1968, abandoned.

[30] Foreign Application Priority Data

May 19, 1967  France...................... 67.106,969

[52] U.S. Cl............................................ 260/659 A
[51] Int. Cl............................................. C07c 17/02
[58] Field of Search............................... 260/659 A

[56] References Cited
UNITED STATES PATENTS

| | | | |
|---|---|---|---|
| 2,846,484 | 8/1958 | Fox.............................. | 260/658 R |
| 3,598,758 | 8/1971 | Koyanagi et al................ | 260/659 A |
| 3,634,330 | 1/1972 | Michel et al.................... | 260/659 A |
| 3,642,918 | 2/1972 | Bohl et al....................... | 260/659 A |

FOREIGN PATENTS OR APPLICATIONS

| | | | |
|---|---|---|---|
| 937,985 | 9/1963 | United Kingdom............. | 260/659 A |
| 1,555,518 | 12/1968 | France........................... | 260/659 A |
| 1,198,730 | 7/1970 | United Kingdom............. | 260/659 A |

OTHER PUBLICATIONS

Mantell, Adsorption, pp. 44, 45, 48, (1951).

*Primary Examiner*—Delbert E. Gantz
*Assistant Examiner*—Joseph A. Boska

[57] ABSTRACT

An oxychlorination process for the conversion of ethylene by reaction with hydrochloric acid and an oxygen-containing gas to produce a product containing at least 9 molar percent of the ethylene in the form of 1,1,2-trichloroethane and 1,1,2,2-tetrachloroethane in which the gaseous reactants are passed through a reaction zone maintained at a temperature within the range of 280° to 370°C. and in the presence of a fluidized bed catalyst with the reactants present in a molar feed ratio of $O_2/C_2H_4$ within the range of 0.63 to 0.9, $HCl/O_2$ within the range of 2.60 to 4.00 and $HCl/C_2H_4$ within the range of 2.10 to 3.05, and in which the molar feed ratio of ethylene is within the range of 0.5 to 20 moles per hour per liter of catalyst with the catalyst having an average specific surface area of at least 1 $m^2/g$.

11 Claims, No Drawings

FLUID BED OXYCHLORINATION OF ETHYLENE

This is a continuation-in-part of copending application Ser. No. 730,604, filed May 20, 1968, now abandoned and entitled "Fluid Bed Oxychlorination of Ethylene".

This invention relates to the preparation of 1,2-dichloroethane, 1,1,2-trichloroethane, 1,1,2,2-tetrachloroethane and pentachloroethane by oxychlorination of ethylene in a process which makes use of a fluidized catalyst.

Processes for production of 1,2-dichloroethane by oxychlorination of ethylene in the presence of a fluidized bed catalyst are well known. Such processes have been addressed towards the production of 1,2-dichloroethane as the desirable product with a view towards minimizing the amounts of by-products that might simultaneously be formed. The prior art is not aware of processes by which substantial amounts of $C_2$ saturated compounds having a higher degree of chlorination than 1,2-dichloroethane, as represented by 1,1,2-trichloroethane, 1,1,2,2-tetrachloroethane and pentachloroethane, can intentionally be produced, especially without simultaneously producing parasitic or undesirable side reactions such as combustion, partial oxidation of ethylene and/or dehydrochlorination reactions which operate to reduce yield, yield undesirable unsaturated $C_2$ chlorinated compounds, and/or render separation and purification more difficult.

Thus, it is an object of this invention to provide a method and means for oxychlorination of ethylene to yield chlorinated $C_2$ saturated compounds including important proportions of 1,1,2-trichloroethane, 1,1,2,2-tetrachloroethane and pentachloroethane in addition to 1,2-dichloroethane, in which the sum of the 1,1,2-trichloroethane and 1,1,2,2-tetrachloroethane is at least 9 mole percent of the transformed ethylene and preferably 11 to 15 mole percent and which can be operated to go as high as 30 mole percent of the transformed ethylene.

The 1,1,2-trichloroethane and the 1,1,2,2-tetrachloroethane represent commercially valuable compounds which find a number of uses alone or as raw materials in the manufacture of vinylidene chloride, cis- and trans-dichloroethylenes and trichloroethylene.

Applicants have achieved the aforementioned objectives with high conversion rate of ethylene and without the parasitic reactions of combustion and dehydrochlorination exceeding 5 molar percent and 3 molar percent respectively, and preferably without exceeding 2 molar percent for each reaction, by careful regulation of the feed ratio of reactants including hydrochloric acid, oxygen and ethylene, and careful control of reaction temperature as well as others of the reaction conditions.

A further object of this invention resides in the combination of conditions which includes a catalytic system which makes use of a fluid bed, a defined reaction zone as well as a feed ratio of reactants, particularly the ratio $O_2/C_2H_4$.

In accordance with the oxychlorination process of this invention, a gaseous mixture of ethylene, hydrochloric acid and an oxygen-containing gas, preferably air, is passed through a reaction zone maintained at a temperature within the range of 280° to 370°C. and preferably 290° to 340°C. at a molar feed rate of ethylene per hour per liter of catalyst of 0.5 to 20, and preferably 2 to 9, with the catalyst maintained in the reaction zone in the form of a fluid bed. Conversion rates in excess of 80% HCl conversion and combustion rate of ethylene of less than 5% are achieved when the gaseous material making up the reaction feed mixture is advanced through the reaction zone in the molar ratios of $O_2/C_2H_4$ within the range of 0.63 to 0.9, $HCl/O_2$ within the range of 2.60 to 4.30, and $HCl/C_2H_4$ within the range of 2.10 to 3.05, with the preferred practice giving a conversion rate in excess of 90% of the HCl conversion and less than about 2% combustion when the gaseous materials making up the reaction mixture advanced through the reaction zone comprise the molar ratio of $O_2/C_2H_4$ within the range of above 0.7 to 0.85, $HCl/O_2$ within the range of 2.65 to 3.50 and $HCl/C_2H_4$ within the range of 2.10 to 2.65. Air has been used as a source of oxygen in the described reactions but other sources of oxygen or oxygen enriched air can be used.

With reference to the conditions described, temperature is a factor in the amount of combustion, yield of valuable chlorinated ethane compounds which are characteristic of the nonselectivity of the reaction, as well as in the amount and type of side reactions. When a temperature in excess of 370°C. is employed, side reactions become excessive and the composition exceeds practical values and excessive amounts of unsaturated compounds are produced. On the other hand, when the temperature is below 280°C., non-selectivity is experienced to a very slight extent, whereby little, if any, of the more highly chlorinated ethanes are produced.

The time of exposure of reaction conditions, or residence time, is of course a factor of temperature, velocity of the reaction gases through the reaction zone and catalyst. Under the conditions described, best results are secured at a residence time of from 5 to 25 seconds and it is usually undesirable to exceed a residence time of 40 seconds.

Similarly, within the described conditions of the reaction, some variation in product mix can be secured by variation in the reactant ratios. For example, preparation of compounds more highly chlorinated than 1,2-dichloroethane increases with increase in the molar ratio of $O_2/C_2H_4$ in the feed. The ratio of side reactions sometimes increases with the increase in the ratio of $O_2/C_2H_4$ in the feed. It has been found further that the amount of side reactions, that is combustion and dehydrochlorination, decreases with increasing ratio of $HCl/O_2$ in the feed while maintaining constant the ratio $O_2/C_2H_4$ in the feed. This provides a means within the conditions of the invention which permits an increase in the non-selectivity of the reaction while decreasing the amount of side reactions.

The applicants have established a correlation between the $O_2/C_2H_4$ and $HCl/O_2$ feed molar ratio, when air is used as gas comprising oxygen. This is to say that by setting beforehand the conversion rate of the ethylene into parasitic burning products ($CO + CO_2$) at an upper limit which must not be exceeded, and which is of 5%, and preferably 2 molar percent, the molar ratio $HCl/O_2$ must have values superior or equal to a limit which depends on the $O_2/C_2H_4$ feed molar ratio. For instance, setting the conversion rate of ethylene into undesired combustion products to a maximum of 2% and working with a $O_2/C_2H_4$ ratio of 0.70 the $HCl/O_2$ molar ratio must be superior or equal to 3.06. When a ratio of $O_2/C_2H_4$ is fixed at 0.90, that of $HCl/O_2$ must be superior or equal to 2.61.

However, in practice it is impossible to indefinitely increase the $HCl/O_2$ ratio because this has for a result a total conversion rate of hydrochloric acid which becomes lower and lower as $HCl/O_2$ increases, which is very seldom desirable. On the contrary, it is most often useful to perform the ethylene oxychlorination process with as high as possible a total conversion rate of hydrochloric acid, that is to say, more than 80% and preferably above 90%, such as between 90% and 96%. For instance, if a total conversion rate of hydrochloric acid of 90% is desired, and that an $O_2/C_2H_4$ molar ratio of 0.70 is used, the $HCl/O_2$ molar ratio must be lower or equal to 3.50. Using a $O_2/C_2H_4$ molar ratio of 0.90, the $HCl/O_2$ molar ratio must be lower or equal to 2.92.

The following Tables I and II set forth the above-mentioned correlation:

TABLE I

Lower limit of the $HCl/O_2$ molar ratio as a function of the $O_2/C_2H_4$ molar ratio for a specified combustion rate limit of $C_2H_4$.

| Maximum Combustion rate (mole %) | 5 | 4 | 3 | 2 |
|---|---|---|---|---|
| $O_2/C_2H_4$ | 0.63 | 0.63 | 0.63 | 0.63 |
| $HCl/O_2$ | 2.83 | 2.90 | 3.01 | 3.22 |
| $O_2/C_2H_4$ | 0.7 | 0.7 | 0.7 | 0.7 |
| $HCl/O_2$ | 2.67 | 2.74 | 2.85 | 3.06 |
| $O_2/C_2H_4$ | 0.9 | 0.9 | 0.9 | 0.9 |
| $HCl/O_2$ | 2.22 | 2.29 | 2.40 | 2.60 |

TABLE II

Upper limit of the $HCl/O_2$ molar ratio as a function of the $O_2/C_2H_4$ molar ratio for a specified conversion rate of HCl.

| Minimum Conversion rate of HCl % | 80 | 90 | 92 | 94 | 96 |
|---|---|---|---|---|---|
| $O_2/C_2H_4$ | 0.63 | 0.63 | 0.63 | 0.63 | 0.63 |
| $HCl/O_2$ | 4.30 | 3.70 | 3.58 | 3.45 | 3.36 |
| $O_2/C_2H_4$ | 0.70 | 0.70 | 0.70 | 0.70 | 0.70 |
| $HCl/O_2$ | 4.07 | 3.50 | 3.39 | 3.27 | 3.18 |
| $O_2/C_2H_4$ | 0.90 | 0.90 | 0.90 | 0.90 | 0.90 |
| $HCl/O_2$ | 3.36 | 2.92 | 2.83 | 2.74 | 2.66 |

Pressure does not have a significant effect on ratio of components in the product but it does affect productivity with increased productivity being obtained with increase in pressure. Thus, it is desirable to carry out the reaction of this invention under a pressure within the range of 1 to 10 absolute bars and preferably 4 to 9 absolute bars. Absolute pressures higher than 10 bars can be used, within the limits of the equipment, but no great advantage is derived from the use of pressures greater than 10 bars.

The catalyst employed in the practice of this invention comprises a catalytic agent deposited on a carrier having an average specific surface greater than 1 $m^2$/g. and preferably greater than 10 $m^2$/g. The term "average specific surface", as used herein, means that if a series of specimens are taken from different parts of the catalytic mass in order to determine the specific surface area of the carrier, in accordance with the B.E.T. method, the results of the determination will show a dispersion with the extremes within 25% of the average specific surface.

The catalyst carrier may preferably be formed of silica based mixtures containing magnesia, with the average particle size of the carrier preferably being within the range of 20 to 400 microns and most preferably 40 to 120 microns. Good results have been secured with attapulgite type clays, which consist essentially of silica and magnesia, and which, when used in the oxychlorination of this reaction, have an average specific surface within the range of 10 to 160 $m^2$/g. Very good results can by obtained with a carrier consisting essentially of synthetic mixtures of silica and magnesia having an average specific surface area within the range of 40 to 200 $m^2$/g and preferably 80 to 160 $m^2$/g. and which exhibits excellent characteristics from the standpoint of fluidization in the fluid bed catalyst. When the upper limit of the average specific surface area is exceeded, combustion is increased and excessive amounts of catalytic cracking takes place to produce $C_1$ products as well as chlorinated ethylenic $C_2$ compounds.

Use can be made of catalytic agents formed of at least one compound of a metal selected from the group of alkali metals, alkaline earth metals, bismuth, cadmium, chromium, cobalt, copper, tin, iron, manganese, magnesium, platinum, rare earths, thorium, vanadium, zirconium, zinc, nickel, or mixtures thereof. Preferred catalysts employ mixtures of a copper salt and a potassium salt (e.g., copper chloride and potassium chloride).

The following examples are given by way of illustration of the practice of this invention and not by way of limitation thereof:

EXAMPLES 1 to 5

The oxychlorination of ethylene is carried out in a reactor made of glass having an internal diameter of 65 mm and a height of 1000 mm and heated externally by an electrical resistance. The lower part of the tube is equipped with a reversed cone filled with glass beads having a diameter of 2 mm for use as a mixing device for the reactants and to diffuse the feed gases into the catalytic bed. The height of the catalytic bed, when at rest after fluidization, is 450 mm. The catalyst is prepared by impregnating an attapulgite clay with an aqueous solution of $Cl_2Cu$, $2 H_2O$ and KCl in a manner such that the final content of dry catalyst, calculated in the cations of copper and potassium, is 8.7% and 4.9% by weight, respectively. The average specific surface area of the carrier, when the catalyst has been operated under normal operating conditions for about 100 hours of reaction, is about 80 $m^2$/g. The catalytic mass has a granulometry ranging from 100 to 315 $\mu$, in which 50% of the mass has a granulometry lower than 210 $\mu$.

During the operation, the reactants, that is, ethylene, air and gaseous hydrochloric acid, are introduced under an absolute pressure of 1.05 bars into the lower portion of the reversed cone and the reactor is heated, with the external electric resistance regulating the temperature of the external wall of the tube with the aid of thermocouples placed between the external wall of the tube and the electrical resistance. The temperature of the catalytic bed is maintained constant and homogeneous at 325°C. ± 2°C. for Examples 1 to 4 and at 350° ± 2°C. for Example 5. The products of the reaction have a composition which varies as a function of the temperature of the catalytic bed and of the feed ratio of the reactants.

Table III presents the results obtained during several thousands of hours of operation in which no variation of catalytic activity was observed during 2500 hours. In Table III there is also set forth a characteristic ratio of the obtained results defined as follows:

$$R = \frac{100(X+Y+Z)}{(W+X+Y+Z)}$$

wherein W represents the conversion rate of ethylene into 1,2-dichloroethane; X represents the conversion rate of ethylene into 1,1,2-trichloroethane; Y represents the conversion rate of ethylene into 1,1,2,2-tetrachloroethane, and Z represents the conversion rate of ethylene into pentachloroethane.

be noticed that the total conversion rate of ethylene and of HCl are low, that the formation of 1,1,2-trichloroethane and 1,1,2,2-tetrachloroethane is extremely low, if any, and that the formation of by-products of the reaction is greater than the formation of the desired product.

EXAMPLE 6

The oxychlorination of ethylene is carried out in the same apparatus and with the same catalyst as in Examples 1 to 5 but with the catalytic bed maintained at a temperature of 360°C. and with an ethylene feed of 3.07 moles/h and per liter of catalyst, and a molar feed ratio of reactants HCl/$O_2$ of 2.63 and $O_2$/$C_2H_4$ of 0.83. A total rate of conversion of ethylene of 91.7% is obtained comprising:

TABLE III

| Examples No. | 1 | 2 | 3 | 4 | 5 | a | b | c |
|---|---|---|---|---|---|---|---|---|
| Flow rate of $C_2H_4$ mole/h and per liter of catalyst | 1.93 | 1.21 | 1.07 | 1.00 | 1.84 | 1.84 | 1.93 | 1.84 |
| Molar feed ratio HCl/$O_2$ | 3.27 | 3.10 | 2.81 | 2.62 | 3.27 | 3.27 | 3.27 | 3.27 |
| $O_2$/$C_2H_4$ | 0.67 | 0.73 | 0.80 | 0.85 | 0.67 | 0.67 | 0.67 | 0.67 |
| HCl/$C_2H_4$ | 2.19 | 2.26 | 2.25 | 2.23 | 2.19 | 2.19 | 2.19 | 2.19 |
| W | 84.8 | 81.0 | 73.8 | 73.0 | 84.0 | 72.5 | 28.2 | 53.1 |
| X | 7.2 | 10.2 | 11.7 | 12.7 | 7.8 | 3.0 | 0.2 | 0.7 |
| Y | 2.1 | 3.9 | 6.6 | 6.1 | 2.4 | 1.0 | — | 0.1 |
| Z | 0.03 | 0.07 | 0.5 | 0.4 | 0.04 | — | — | — |
| Conversion rate of $C_2H_4$ into $CO_2$ | 1.3 | 2.2 | 4.1 | 4.5 | 1.9 | 7.5 | 0.2 | 1.0 |
| Conversion rate of $C_2H_4$ into chlorinated ethylenic by-products | 0.8 | 1.0 | 1.8 | 1.6 | 1.4 | 4.3 | 0.5 | 1.3 |
| Total conversion rate of reactants $C_2H_4$ molar % | 96.2 | 98.7 | 98.6 | 98.9 | 97.6 | 88.5 | 29.1 | 56.3 |
| HCl | 92.3 | 93.1 | 96.0 | 96.7 | 92.1 | 74.2 | 26.2 | 50.4 |
| (W + X + Y + Z) | 94.13 | 95.17 | 92.6 | 92.2 | 94.24 | 76.5 | 28.4 | 53.9 |
| $R = \frac{100(X+Y+Z)}{(W+X+Y+Z)}$ | 9.9 | 14.9 | 20.3 | 20.8 | 10.9 | 5.2 | 0.7 | 1.5 |

These results show that an important proportion of 1,1,2-trichloroethane and 1,1,2,2-tetrachloroethane is obtained along with 1,2-dichloroethane without excessive combustion or formation of such by-products as vinyl chloride or dichloroethylenes.

By way of comparison, Example 5 of the preceding Table III was repeated at a temperature of 375°C. (Example a). This illustrates that beyond the temperature limit of 370°C. the yield of desirable product becomes lower by reason of the very rapid development of the combustion reaction of ethylene. In effect, this test is characterized by a low formation of 1,1,2-trichloroethane and 1,1,2,2-tetrachloroethane and by a total conversion rate of ethylene and of hydrochloric acid far below the rates obtained at 325°C.

By way of further comparison, Examples b and c of Table III show the results obtained while working under conditions analogous to those of Examples 1 and 5 but with a catalyst carrier having an average specific surface area less than 1 m²/g. For this purpose, use was made of a catalyst prepared by impregnation, under identical conditions as in Examples 1 to 5, an aluminum having an average specific surface area of 0.8 m²/g. The catalyst granulometry or granular distribution was similar to that of the catalyst used in Examples 1 to 5. It will

- 1,2-dichloroethane         75.7 molar %
- 1,1,2-trichloroethane       7.7 molar %
- 1,1,2,2-tetrachloroethane   3.2 molar %
- pentachloroethane           0.8 molar %

The formation of $CO_2$ and of by-products is respectively 2.3% and 1.8% of the ethylene. The total conversion rate of hydrochloric acid is 86.1% and the ratio R is 13.4.

EXAMPLE 7

An oxychlorination reaction of ethylene is carried out in a nickel reactor having an internal diameter of 162 mm and a height of 2500 mm, externally heated by electrical resistance coils and jacketed for cooling by the circulation of a thermal fluid through a copper coil. At its lower portion, a perforated screen having openings of 3 mm in diameter, representing 1.2% of empty space, is employed to distribute the gaseous reactants which have previously been mixed. At its upper portion, a filtration device operates to hold back the catalyst particles which might be entrained in the gaseous stream. The catalyst is prepared by impregnating an attapulgite clay by means of a solution of copper and potassium chlorides. The particle size range (granulometry) of the prepared catalyst is 50 to 620 microns with an average of about 350 microns. The proportion of copper and potassium cations is respectively 10% and 6% by weight of the prepared catalyst. The average specific surface area of the carrier is about 25 m$^2$/g after 500 hours of use of the catalyst. A mixture of reactants, namely, ethylene, air and hydrochloric acid, is introduced into the reactor under an absolute pressure of 1.2 bar and in a molar ratio of $O_2/C_2H_4$ of 0.75 and $HCl/O_2$ of 3.0.

The flow rate of ethylene is 1.8 moles per hour per liter of catalyst. The height of the catalytic bed at rest is 2500 mm and the homogeneous temperature of the fluid bed is maintained at 340°C.

Under these conditions the following results are obtained:

| | |
|---|---|
| Total conversion rate of ethylene | 100 % |
| Total conversion rate of hydrochloric acid | 95.5% |
| Conversion rate of ethylene into 1,2-dichloroethane | 82 % |
| Conversion rate of ethylene into 1,1,2-trichloroethane | 10.8% |
| Conversion rate of ethylene into 1,1,2,2-tetrachloroethane | 3.8% |
| Conversion rate of ethylene into pentachloroethane | 0.1% |
| Conversion rate of ethylene into chlorinated ethylenic compounds | 1.5% |
| Conversion rate of ethylene into combustion products ($CO_2$) | 1.6% |
| Conversion rate of ethylene into chlorinated methane products | 0.2% |
| The ratio R as defined in Example 1 is of | 15 % |

By way of comparison, Example 7 has been reproduced but with a molar feed ratio of $O_2/C_2H_4$ of 0.45 and $HCl/O_2$ of 3.

The results are the following:

| | |
|---|---|
| Total conversion rate of ethylene | 82.3% |
| Total conversion rate of hydrochloric acid | 72.3% |
| Conversion rate of ethylene into 1,2-dichloroethane | 76.2% |
| Conversion rate of ethylene into 1,1,2-trichloroethane | 2.5% |
| Conversion rate of ethylene into 1,1,2,2-tetrachloroethane | 0.1% |
| Conversion rate of ethylene into pentachloroethane | 0.0% |
| Conversion rate of ethylene into chlorinated ethylenic compounds | 2.7% |
| Conversion rate of ethylene into combustion products ($CO_2$) | 0.6% |
| Conversion rate of ethylene into chlorinated methane products | 0.2% |
| The ratio R is only of | 3.5% |

The test is characterized by wholly insufficient total conversion rate of ethylene and hydrochloric acid and by a very low amount of 1,1,2-trichloroethane and 1,1,2,2-tetrachloroethane in the product.

Also by way of comparison, an oxychlorination reaction was performed in accordance with Example 7 except that the feed molar ratio of $O_2/C_2H_4$ of 0.70 and $HCl/O_2$ of 2.3 was employed.

The results secured are as follows:

| | |
|---|---|
| total conversion rate of ethylene | 82.2% |
| Total conversion rate of hydrochloric acid | 98 % |
| Conversion rate of ethylene into 1,2-dichloroethane | 65.3% |
| Conversion rate of ethylene into 1,1,2-trichloroethane | 3.7% |
| Conversion rate of ethylene into 1,1,2,2-tetrachloroethane | 0.4% |
| Conversion rate of ethylene into pentachloroethane | 0.0% |
| Conversion rate of ethylene into chlorinated ethylenic compounds | 1.7% |
| Conversion rate of ethylene into combustion products ($CO_2$) | 11.1% |
| The ratio R is only of | 6.5% |

It may be noted that the total conversion rate of ethylene is insufficient, and particularly that excessive combustion occurred. The amount of 1,1,2-trichloroethane and 1,1,2,2-tetrachloroethane was at a low level.

EXAMPLE 8

In the same apparatus as that of Example 7, a mixture of reactants ethylene, air and hydrochloric acid in a molar ratio of $O_2/C_2H_4$ of 0.75 and $HCl/O_2$ of 3.05 are introduced under an absolute pressure of 1.2 bars at a flow rate of ethylene of 2.3 moles per hour per liter of catalyst.

The height of the fluid bed, at rest, is 1200 mm. The catalyst is the same as that of Example 7 to which 4% by weight of rare earth oxides, based upon the prepared catalyst, are added. The reaction temperature was 340°C.

The results secured are as follows:

| | |
|---|---|
| Total conversion rate of ethylene | 99.5% |
| Total conversion rate of hydrochloric acid | 94.6% |
| Total conversion rate of ethylene into 1,2-dichloroethane | 79.0% |
| Total conversion rate of ethylene into 1,1,2-trichloroethane | 11.7% |
| Total conversion rate of ethylene into 1,1,2,2-tetrachloroethane | 4.9% |
| Total conversion rate of ethylene into pentachloroethane | 0.3% |
| Total conversion rate of ethylene into chlorinated ethylenic compounds | 1.8% |
| Total conversion rate of ethylene into combustion products ($CO_2$) | 1.6% |
| Total conversion rate of ethylene into chlorinated methane products | 0.2% |
| The ratio R as defined in Example 1 is of | 17.5% |

EXAMPLE 9

Using the same apparatus, the same catalyst and the same temperature as in Example 7, ethylene is oxychlorinated under the following conditions:

| | |
|---|---|
| Pressure of reactants: | 2.5 absolute bars |
| Molar ratio of $O_2$ in air/$C_2H_4$: | 0.80 |
| HCl of air: | 3.0 |
| Flow rate of ethylene is 6.5 moles per hour per liter of catalyst | |
| Height of the catalyst bed, at rest: | 1200 mm |

| | |
|---|---|
| Total conversion rate of ethylene | 99 % |
| Total conversion rate of hydrochloric acid | 90 % |
| Conversion rate of ethylene into 1,2-dichloroethane | 80.2% |
| Conversion rate of ethylene into | |

-Continued

| | |
|---|---|
| Pressure of reactants: | 2.5 absolute bars |
| Molar ratio of O₂ in air/C₂H₄: | 0.80 |
| HCl of air: | 3.0 |
| Flow rate of ethylene is 6.5 moles per hour per liter of catalyst | |
| Height of the catalyst bed, at rest: | 1200 mm |

| | |
|---|---|
| 1,1,2-trichloroethane | 10.6% |
| Conversion rate of ethylene into 1,1,2,2-tetrachloroethane | 5.4% |
| Conversion rate of ethylene into pentachloroethane | 0.2% |
| Conversion rate of ethylene into chlorinated ethylenic compounds | 1.5% |
| Conversion rate of ethylene into chlorinated methane products | 0.1% |
| Conversion rate of ethylene into combustion products (CO₂) | 1.0% |
| The ratio R as defined in Example 1 is of | 17 % |

EXAMPLE 10

Oxychlorination of ethylene is carried out in an ordinary steel reactor having an internal diameter of 240 mm and a height of 3500 mm, externally heated by electrical heating rings. At its lower portion a perforated screen having a plurality of openings of 3 mm in diameter to provide 0.4% voids is used to distribute the reagents introduced which have previously been mixed. Within the reactor, at a height of 600 mm, a group of 9 vertical tubes are connected transversely one to another by a thermal fluid. At its upper portion, the reactor is equipped with a system of cyclones to retain the catalyst particles entrained in the gaseous stream. The catalyst is the same as that of Example 7.

A mixture of reactants ethylene, air and hydrochloric acid are introduced into the reactor in a feed molar ratio of $O_2/C_2H_4$ of 0.80 and $HCl/O_2$ of 3.1, under an absolute pressure of 1.3 bar while the flow rate of ethylene is 1.9 moles per hour per liter of catalyst. The height of the fluidized bed, at rest, is 2600 mm and a substantially uniform temperature of 340°C. is maintained throughout the bed.

Under these conditions, the results obtained are as follows:

| | |
|---|---|
| Total conversion rate of ethylene | 98.5% |
| Total conversion rate of hydrochloric acid | 89.2% |
| Conversion rate of ethylene into 1,2-dichloroethane | 78.2% |
| Conversion rate of ethylene into 1,1,2-trichloroethane | 10.8% |
| Conversion rate of ethylene into 1,1,2,2-tetrachloroethane | 6.0% |
| Conversion rate of ethylene into pentachloroethane | 0.3% |
| Conversion rate of ethylene into chlorinated ethylenic compounds | 1.7% |
| Conversion rate of ethylene into combustion products (CO₂) | 1.3% |
| Conversion rate of ethylene into chlorinated methane products | 0.2% |
| The ratio R as defined in Example 1 is of | 18 % |

EXAMPLE 11

An ordinary steel reactor consisting of a pipe having an internal diameter of 50 cm and a height of 600 cm is equipped at its lower portion with a screen perforated with 104 holes each having a diameter of 0.4 cm to distribute the reactants introduced which have previously been mixed. At the inside of the reactor and at a height of 300 cm, a group of 8 vertical interconnected tubes is traversed by a thermal fluid. At the upper part of the reactor, a cyclone separator is located to return catalyst particles entrained with the gaseous stream.

The catalyst is prepared by impregnation of an attapulgite clay with a copper and potassium chloride solution. The particle size range of the prepared catalyst is 50 to 700 microns with an average size of about 330 microns. The amount of copper cations is 8% by weight and the weight ratio of $Cu^{++}/K^+$ is about 1.

The average specific surface area of the carrier, after 300 hours of operation in the oxychlorination reaction, is about 30 m²/g.

The reactants ethylene, air and hydrochloric acid are introduced into the reactor under an absolute pressure of 1.8 bars in a molar ratio of $O_2/C_2H_4$ of 0.74 and $HCl/O_2$ of 3.12. The flow rate of ethylene is 1.04 moles per hour per liter of catalyst and the height of the fluid bed is 400 cm. A uniform temperature of 340°C. is maintained in the fluid bed. Under these conditions, the following results were obtained:

| | |
|---|---|
| Total conversion rate of ethylene | 95.6% |
| Total conversion rate of hydrochloric acid | 89.5% |
| Conversion rate of ethylene into 1,2-dichloroethane | 81.0% |
| Conversion rate of ethylene into 1,1,2-trichloroethane | 9.0% |
| Conversion rate of ethylene into 1,1,2,2-tetrachloroethane | 2.7% |
| Conversion rate of ethylene into pentachloroethane | 0.3% |
| Conversion rate of ethylene into chlorinated ethylenic compounds | 0.8% |
| Conversion rate of ethylene into combustion products (CO₂) | 1.8% |
| The ratio R as defined in Example 1 is of | 13 % |

EXAMPLE 12

An oxychlorination reaction of ethylene is carried out in the same apparatus as that of Examples 1 to 5, but with a catalytic bed consisting of 1.5 liters of a catalyst prepared with silica microspheres having an average particle size of about 160 microns and having a specific surface area of 250 m²/g and impregnated with $CuCl_2, 2H_2O$ and KCl solution in an amount to withhold 10% by weight of copper cations and 6% by weight of potassium cations with respect to the prepared dry catalyst.

The reactor is fed with a mixture of ethylene, HCl and air, with the flow rate of ethylene being 1.24 moles per hour per liter of catalyst and in a molar feed ratio of $O_2/C_2H_4$ of 0.73 and $HCl/O_2$ of 3.11. A temperature of 322°C. is maintained in the fluid bed and ethylene is converted into various compounds with the following conversion rates:

| | |
|---|---|
| - 1,2-dichloroethane | 84.8 molar % |
| - 1,1,2-trichloroethane | 7.4 molar % |
| - 1,1,2,2-tetrachloroethane | 3.6 molar % |
| - Pentachloroethane | 0.3 molar % |
| - CO₂ | 0.9 molar % |
| - Chlorinated ethylene by-products | 1.7 molar % |

The total conversion rates of ethylene and HCl are respectively 98.7 and 93.1%. The chlorinated ethane compounds represent a total of 96.1 molar percent of the ethylene involved and the ratio R is 11.7%.

EXAMPLES 13 to 16

Oxychlorination of ethylene is carried out with the same apparatus as in Examples 1 to 5 with the catalyst prepared by impregnating microspheres of a mixture of silica (75% by weight) and magnesia (25% by weight) with an aqueous solution of $Cl_2Cu$, $2H_2O$ and KCl, so that the final content of the dry catalyst in copper and potassium cations is 7% and 2.8% by weight, respectively. The average specific surface area of the carrier is of 150 m²/g and remains practically unchanged in the course of normal running conditions. The particle size of the catalytic mass ranges from 20 to 160 microns, 50% of this mass having a particle size lower than 100 microns.

The experimental conditions and results are set forth in the following table:

TABLE IV

| Examples No. | | 13 | 14 | 15 | 16 |
|---|---|---|---|---|---|
| Flow rate of $C_2H_4$ mole/h and per liter of catalyst | | 0.75 | 0.75 | 1.71 | 1.23 |
| Molar feed ratio | $HCl/O$ | 3.02 | 2.84 | 3.07 | 3.34 |
| | $O/C_2H_4$ | 0.81 | 0.81 | 0.70 | 0.69 |
| | $HCl/C_2H_4$ | 2.45 | 2.30 | 2.15 | 2.30 |
| Temperature °C. | | 300° | 325° | 340° | 340° |
| W | | 81.4 | 79. | 79.6 | 79.5 |
| X | | 9.4 | 9.9 | 6.1 | 7.9 |
| Y | | 3.7 | 5.7 | 3.6 | 4.3 |
| Z | | 0.1 | 0.1 | 0.1 | 0.1 |
| Conversion rate of $C_2H_4$ into $CO_2$ | | 1.9 | 2.3 | 1.4 | 1.5 |
| Conversion rate of $C_2H_4$ into chlorinated ethylenic by-products | | 0.7 | 0.7 | 2.0 | 2.2 |
| Total conversion rate of reactants molar percent | $C_2H_4$ | 97.2 | 97.7 | 92.9 | 95.6 |
| | HCl | 91.2 | 91.5 | 86.5 | 84.0 |
| $\Sigma(W+X+Y+Z)$ | | 94.6 | 94.7 | 89.4 | 90.8 |
| Ratio R as defined in Example 1 | | 13.9 | 16.6 | 11.0 | 13.6 |

The characteristics from the standpoint of fluidization of the catalyst carrier in the fluid bed catalyst are excellent. The characteristics are found to be practically unaffected in the course of operation.

EXAMPLES 17 and 18

The oxychlorination of ethylene is carried out in an Inconel reactor (73% Ni alloy) having an internal diameter of 120 mm and a height of 2000 mm and heated externally by an electrical resistance. The lower part of the reactor is provided with a perforated screen having openings of 3 mm in diameter to provide 1.2% of empty space, which screen is employed to distribute the gaseous reactants which have previously been mixed. At its upper portion, a filtration device operates to hold back the catalyst particles which might be entrained in the gaseous stream. The catalyst is the same as in Examples 1 to 5, except that the average particle size of said catalyst is of 140 microns instead of 210 microns.

During the operation, ethylene, air and gaseous hydrochloric acid are introduced under an absolute pressure of 7.2 bars in to the lower part of the reactor through the perforated screen. The reactor is heated with the external electric resistance regulating the temperature of the external wall of the tube with the aid of thermocouples placed between the external wall of the tube and the electrical resistance. The temperature of the catalytic fluid bed is maintained constant and homogeneous at 330°C. ± 2°C.

The following table sets forth the results obtained:

TABLE V

| Examples No. | | 17 | 18 |
|---|---|---|---|
| Flow rate of $C_2H_4$ mole/h and per liter catalyst | | 9.2 | 9.2 |
| Molar feed ratio | $HCl/O_2$ | 2.94 | 2.60 |
| | $O_2/C_2H_4$ | 0.80 | 0.90 |
| | $HCl/C_2H_4$ | 2.35 | 2.34 |
| Temperature °C. | | 330° | 330° |
| W | | 81.0 | 79.2 |
| X | | 8.3 | 9.8 |
| Y | | 3.6 | 4.4 |
| Z | | 0.13 | 0.26 |
| Conversion rate of $C_2H_4$ into $CO_2$ | | 2.0 | 2.4 |
| Conversion rate of $C_2H_4$ into chlorinated ethylenic products and $C_2H_5Cl$ | | 1.4 | 1.4 |
| Total conversion rate of reactants molar % | $C_2H_4$ | 96.7 | 97.5 |
| | HCl | 87. | 88. |
| $\Sigma(W+X+Y+Z)$ | | 93. | 93.7 |
| Ratio R as defined in Example 1 | | 12.8 | 15.2 |

The characteristics from the standpoint of fluidization of the catalyst carrier in the fluid bed catalyst are good but in the course of operation, these characteristics are found to be affected and therefore do not maintain themselves continuously.

It will be understood that changes may be made in the details of operation without departing from the spirit of the invention, especially as defined in the following claims.

We claim:

1. A process for the oxychlorination of ethylene to produce a product in which at least 9 mole percent of the ethylene is converted to 1,1,2-trichloroethane and 1,1,2,2-tetrachloroethane with not more than 5 mole percent of the ethylene converted to combustion products and not more than 3 mole percent of the ethylene converted to chloroethylenes comprising the steps of passing a gaseous mixture of ethylene, HCl and an oxygen-containing gas through a reaction zone maintained at a temperature within the range of 280° to 370°C. in the presence of an oxychlorination catalyst deposited on a carrier consisting essentially of silica and magnesia having a surface area within the range of 10–200 m²/g. in a fluidized state, in which the materials are advanced into the reaction zone in a molar ratio of $O_2C_2H_4$ within the range of 0.63 to 0.9, $HCl/O_2$ within the range of 2.6 to 4.30 and $HCl/C_2H_4$ within the range of 2.10 and 3.05.

2. A process as defined in claim 1 wherein the carrier is selected from a group consisting of attapulgite clay having a surface area within the range of 10–160 m$^2$/g. and a synthetic mixture of silica and magnesia having a surface area within the range of 40–200 m$^2$/g.

3. A process as defined in claim 1 in which the materials are introduced in the feed ratio of $O_2/C_2H_4$ within the range of 0.7 to 0.85, $HCl/O_2$ within the range of 2.65 to 3.50, and $HCl/C_2H_4$ within the range of 2.10 to 2.65.

4. A process as defined in claim 1 in which the temperature of the reaction zone is maintained within the range of 290° to 340°C.

5. A process as defined in claim 1 in which the molar feed ratio of ethylene is within the range of 0.5 to 20 moles per hour per liter of catalyst.

6. A process as defined in claim 1 in which the molar feed ratio of ethylene is within the range of 2 to 9 moles per hour per liter of catalyst.

7. A process as defined in claim 1 in which the reaction is carried out under a pressure within the range of 1 to 10 absolute bars.

8. A process as defined in claim 1 in which the reaction is carried out under a pressure within the range of 4 to 9 absolute bars.

9. A process as defined in claim 1 in which the gaseous reactants are in the reaction zone for a residence time up to 40 seconds.

10. A process as defined in claim 1 in which the gaseous reactants are in the reaction zone for a residence time of from 5 to 25 seconds.

11. A process for the oxychlorination of ethylene to produce a product in which at least 9 mole percent of the ethylene is converted to 1,1,2-trichloroethane and 1,1,2,2-tetrachloroethane with not more than 5 mole percent of the ethylene converted to combustion products and not more than 3 mole percent of the ethylene converted to chloroethylenes, comprising the steps of passing a gaseous mixture of ethylene, HCl and an oxygen-containing gas through a reaction zone maintained at a temperature within the range of 280° to 370°C in the presence of a copper chloride catalyst deposited on a carrier selected from a group consisting of attapulgite clay having a surface area within the range of 10–160 m$^2$/g and a synthetic mixture of silica and magnesia having a surface area within the range of 40–200 m$^2$/g in a fluidized state, in which the materials are advanced into the reaction zone in a molar ratio of $O_2/C_2H_4$ within the range of 0.63 to 0.9, $HCl/O_2$ within the range of 2.6 to 4.30 and $HCl/C_2H_4$ within the range of 2.10 and 3.05.

* * * * *

UNITED STATES PATENT OFFICE
CERTIFICATE OF CORRECTION

Patent No. 3,907,912          Dated September 23, 1975

Inventor(s) Albert ANTONINI et al.

It is certified that error appears in the above-identified patent and that said Letters Patent are hereby corrected as shown below:

In column 9, please delete lines 1 to 6.

Signed and Sealed this

*twenty-seventh* Day of *January 1976*

[SEAL]

Attest:

RUTH C. MASON
*Attesting Officer*

C. MARSHALL DANN
*Commissioner of Patents and Trademarks*